(12) United States Patent
Phillips et al.

(10) Patent No.: US 7,930,624 B2
(45) Date of Patent: Apr. 19, 2011

(54) EDITING TIME-BASED MEDIA WITH ENHANCED CONTENT

(75) Inventors: Michael Phillips, Melrose, MA (US);
Brian Cooper, Foxboro, MA (US);
Larisa Fay, Andover, MA (US)

(73) Assignee: Avid Technology, Inc., Burlington, MA (US)

( * ) Notice: Subject to any disclaimer, the term of this patent is extended or adjusted under 35 U.S.C. 154(b) by 1950 days.

(21) Appl. No.: 10/115,693

(22) Filed: Apr. 4, 2002

(65) Prior Publication Data
US 2003/0018609 A1 Jan. 23, 2003

Related U.S. Application Data

(63) Continuation of application No. 09/838,782, filed on Apr. 20, 2001.

(51) Int. Cl.
*G06F 17/00* (2006.01)
(52) U.S. Cl. ........................................ 715/201; 725/110
(58) Field of Classification Search ............... 715/500.1, 715/201; 725/110
See application file for complete search history.

(56) References Cited

U.S. PATENT DOCUMENTS

| | | | |
|---|---|---|---|
| 4,538,188 | A | 8/1985 | Barker et al. |
| 4,685,003 | A | 8/1987 | Westland |
| 4,746,994 | A | 5/1988 | Ettlinger |
| 5,012,334 | A | 4/1991 | Etra |
| 5,045,940 | A | 9/1991 | Peters et al. |

(Continued)

FOREIGN PATENT DOCUMENTS
EP 0403118 12/1990
(Continued)

OTHER PUBLICATIONS

Zhang, et al., "Video parsing, retrieval and browsing: an integrated and content-based solution", Proceedings of the third ACM international conference on Multimedia, published 1995, p. 15-25, renumbered in printout copy as p. 1-18.*

(Continued)

*Primary Examiner* — Amelia Rutledge
(74) *Attorney, Agent, or Firm* — Oliver Strimpel

(57) ABSTRACT

Creation of a program with interactive content and time-based media would be improved by having several people working simultaneously on both the interactive content and the time-based media. The range of types of data that can be associated with the time-based media also can include a variety of types of content that enhance the time-based media, including data that is opaque to the editing system. To support editing of such programs, enhanced content may be edited into a program as either a clip or a locator, according to a user's selection. The components that represent enhanced content also may be edited in the same way as components that represent time-based media. Enhanced content may be represented by enhancement files that include data defining enhancements. An enhancement includes an identifier of the enhancement within the enhancement file, and a reference to a file defining enhanced content associated with the enhancement. Such enhancement files may be imported into a bin of an editing system to create components that describe the enhanced content referenced by the enhancements. The enhanced content may be modified using native applications for the enhanced content during editing of the program. The components describing the enhanced content in the editing system can be updated using identifiers of the enhanced content that are stored by the components. Enhanced content also may be automatically synchronized with time-based media.

30 Claims, 5 Drawing Sheets

U.S. PATENT DOCUMENTS

| | | |
|---|---|---|
| 5,097,351 A | 3/1992 | Kramer |
| 5,196,933 A | 3/1993 | Henot |
| 5,214,528 A | 5/1993 | Akanabe et al. |
| 5,237,648 A | 8/1993 | Mills et al. |
| 5,267,351 A | 11/1993 | Reber et al. |
| 5,274,758 A | 12/1993 | Beitel et al. |
| 5,307,456 A | 4/1994 | MacKay |
| 5,317,732 A | 5/1994 | Gerlach, Jr. et al. |
| 5,355,450 A | 10/1994 | Garmon et al. |
| 5,390,138 A | 2/1995 | Milne et al. |
| 5,404,316 A | 4/1995 | Klinger et al. |
| 5,428,731 A | 6/1995 | Powers, III |
| 5,442,744 A | 8/1995 | Piech et al. |
| 5,467,288 A | 11/1995 | Fasciano et al. |
| 5,488,433 A | 1/1996 | Washino et al. |
| 5,489,947 A | 2/1996 | Cooper |
| 5,493,568 A | 2/1996 | Sampat et al. |
| 5,513,306 A | 4/1996 | Mills et al. |
| 5,515,490 A | 5/1996 | Buchanan et al. |
| 5,534,942 A | 7/1996 | Byers, Jr. et al. |
| 5,537,141 A | 7/1996 | Harper et al. |
| 5,537,157 A | 7/1996 | Washino et al. |
| 5,539,869 A | 7/1996 | Spoto et al. |
| 5,541,662 A | 7/1996 | Adams et al. |
| 5,561,457 A | 10/1996 | Cragun et al. |
| 5,568,275 A | 10/1996 | Norton et al. |
| 5,577,190 A | 11/1996 | Peters |
| 5,584,006 A | 12/1996 | Reber et al. |
| 5,585,858 A | 12/1996 | Harper et al. |
| 5,592,602 A | 1/1997 | Edmunds et al. |
| 5,613,057 A | 3/1997 | Caravel |
| 5,617,146 A | 4/1997 | Duffield et al. |
| 5,619,636 A | 4/1997 | Sweat et al. |
| 5,623,308 A | 4/1997 | Civanlar et al. |
| 5,652,714 A | 7/1997 | Peterson et al. |
| 5,659,790 A | 8/1997 | Kim et al. |
| 5,659,792 A | 8/1997 | Walmsley |
| 5,659,793 A | 8/1997 | Escobar et al. |
| 5,664,216 A | 9/1997 | Blumenau |
| 5,680,619 A | 10/1997 | Gudmundson et al. |
| 5,682,326 A | 10/1997 | Klinger et al. |
| 5,684,963 A | 11/1997 | Clement |
| 5,712,953 A | 1/1998 | Langs |
| 5,724,605 A | 3/1998 | Wissner |
| 5,752,029 A | 5/1998 | Wissner |
| 5,754,851 A | 5/1998 | Wissner |
| 5,760,767 A | 6/1998 | Shore et al. |
| 5,764,275 A | 6/1998 | Lappington et al. |
| 5,767,846 A | 6/1998 | Nakamura et al. |
| 5,781,435 A | 7/1998 | Holroyd et al. |
| 5,801,685 A | 9/1998 | Miller et al. |
| 5,822,019 A | 10/1998 | Takeuchi et al. |
| 5,826,102 A * | 10/1998 | Escobar et al. ............ 715/500.1 |
| 5,852,435 A | 12/1998 | Vigneaux et al. |
| 5,860,073 A | 1/1999 | Ferrel et al. |
| 5,861,881 A | 1/1999 | Freeman et al. |
| 5,889,514 A | 3/1999 | Boezeman et al. |
| 5,892,506 A | 4/1999 | Hermanson |
| 5,892,507 A | 4/1999 | Moorby et al. |
| 5,905,841 A | 5/1999 | Peters et al. |
| 5,907,366 A | 5/1999 | Farmer et al. |
| 5,910,825 A | 6/1999 | Takeuchi |
| 5,926,613 A | 7/1999 | Schaffer |
| 5,930,445 A | 7/1999 | Peters et al. |
| 5,946,445 A | 8/1999 | Peters et al. |
| 5,969,716 A | 10/1999 | Davis et al. |
| 5,977,962 A | 11/1999 | Chapman et al. |
| 5,978,648 A | 11/1999 | George et al. |
| 5,982,445 A | 11/1999 | Eyer et al. |
| 5,995,951 A | 11/1999 | Ferguson |
| 5,999,173 A | 12/1999 | Ubillos |
| 6,016,362 A | 1/2000 | Kato et al. |
| 6,037,932 A | 3/2000 | Feinleib |
| 6,038,573 A | 3/2000 | Parks |
| 6,058,236 A | 5/2000 | Peters et al. |
| 6,081,262 A | 6/2000 | Gill et al. |
| 6,091,407 A | 7/2000 | Boetje et al. |
| 6,092,122 A | 7/2000 | Liu et al. |
| 6,118,444 A | 9/2000 | Garmon et al. |
| 6,195,497 B1 | 2/2001 | Nagasaka et al. |
| 6,199,082 B1 | 3/2001 | Ferrel et al. |
| 6,201,924 B1 | 3/2001 | Crane et al. |
| 6,212,527 B1 | 4/2001 | Gustman |
| 6,230,173 B1 | 5/2001 | Ferrel et al. |
| 6,236,395 B1 * | 5/2001 | Sezan et al. .................. 715/723 |
| 6,243,087 B1 | 6/2001 | Davis et al. |
| 6,249,280 B1 | 6/2001 | Garmon et al. |
| 6,262,723 B1 | 7/2001 | Matsuzawa et al. |
| 6,262,724 B1 | 7/2001 | Crowe et al. |
| 6,330,004 B1 | 12/2001 | Matsuzawa et al. |
| 6,353,461 B1 | 3/2002 | Shore et al. |
| 6,400,378 B1 | 6/2002 | Snook |
| 6,404,978 B1 | 6/2002 | Abe |
| 6,411,725 B1 | 6/2002 | Rhoads |
| 6,426,778 B1 | 7/2002 | Valdez, Jr. |
| 6,430,355 B1 | 8/2002 | Nagasawa |
| 6,476,828 B1 | 11/2002 | Burkett et al. |
| 6,484,199 B2 | 11/2002 | Eyal |
| 6,489,969 B1 | 12/2002 | Garmon et al. |
| 6,544,294 B1 | 4/2003 | Greenfield et al. |
| 6,546,405 B2 | 4/2003 | Gupta et al. |
| 6,553,142 B2 | 4/2003 | Peters |
| 6,564,263 B1 | 5/2003 | Bergman et al. |
| 6,597,375 B1 * | 7/2003 | Yawitz .......................... 715/723 |
| 6,618,547 B1 | 9/2003 | Peters et al. |
| 6,654,933 B1 | 11/2003 | Abbott et al. |
| 6,715,126 B1 * | 3/2004 | Chang et al. ............... 715/500.1 |
| 2002/0188628 A1 | 12/2002 | Cooper et al. |
| 2003/0018609 A1 | 1/2003 | Phillips et al. |
| 2004/0268224 A1 | 12/2004 | Balkus et al. |
| 2005/0120127 A1 | 6/2005 | Bradley et al. |

FOREIGN PATENT DOCUMENTS

| | | |
|---|---|---|
| EP | 0469850 | 2/1992 |
| EP | 0526064 | 2/1993 |
| EP | 0564247 | 10/1993 |
| EP | 0592250 | 4/1994 |
| EP | 0596823 | 5/1994 |
| EP | 0613145 | 8/1994 |
| EP | 0689133 | 10/1995 |
| EP | 0706124 | 4/1996 |
| GB | 2336025 | 10/1999 |
| WO | WO88/07719 | 10/1988 |
| WO | WO93/21636 | 10/1993 |
| WO | WO94/03897 | 2/1994 |
| WO | WO94/29868 | 12/1994 |
| WO | WO96/26600 | 8/1996 |
| WO | WO96/31829 | 10/1996 |
| WO | WO96/36007 | 11/1996 |
| WO | WO97/12342 | 4/1997 |
| WO | WO97/37497 | 10/1997 |
| WO | WO98/04984 | 2/1998 |
| WO | WO99/52045 | 10/1999 |
| WO | WO00/73875 | 12/2000 |

OTHER PUBLICATIONS

AAF Specification Version 1.0 DR4, 2000, pp. i-181.

Ackermann, Phillipp, "Design and Implementation of an Object-oriented Media Composition Framework", Int'l. Computer Music Conference, 1994.

Agnew, J.N. et al., "The Right Tool for the Job: A Quest for the Perfect Authoring Package", Proceedings of SIGDOC '92: 10th Annual ACM Conference on Systems Documentation, Oct. 1992, Ottawa, Ontario, Canada, pp. 253-258.

"Authorware Users Guide", Macromedia Inc., 1992, pp. 8-9, 12-13, 15, 17, 20, 25, 28-31, 36-37, 43, 46-47, 115, 178-179, 191, 232, 242, 301-302.

Baecker, R. et al., "A Multimedia System for Authoring Motion Pictures", ACM Multimedia 1996, pp. 31-42.

Blakowski, Gerold, et al., "Tools for Specifying and Executing Synchronized Multimedia Presentations", Proc. 2nd Int'l. Workshop on OS for Digital Audio Video, Nov. 18-19, 1991, pp. 271-279.

The Brughetti Corporation, Product Information for PURE Image Creator, SLICE Transition Maker and AIR Playout Manager, 1994, (11 pages).

Buchanan, M. Cecelia, et al., "Automatic Temporal Layout Mechanisms", Proc. ACM Multimedia 1993, pp. 341-350.
Buchanan, M. Cecelia, et al., "Specifying Temporal Behavior in Hypermedia Documents", ECHT '92, pp. 262-271.
Buford, John F., "Integrating Object-Oriented Scripting Languages with HyTime", from Proceedings of ICMCS 1994 IEEE, pp. 1-10.
Bulterman, Dick C.A., et al., "Multimedia Authoring Tools: State of the Art and Research Challenges", LNCS 1000, 1995, pp. 1-17.
Chiu, Patrick et al., A Dynamic Grouping Technique for Ink and Audio Notes, USIT-98, San Francisco, CA, 1998 ACM, pp. 195-202.
Chiueh, Tzi-cker, et al., Zodiac: A History-Based Interactive Video Authoring System:, ACM Multimedia '98, Bristol, UK, 1998 ACM, pp. 435-443.
Chua, Tat-Seng, et al., "A Video Retrieval and Sequencing System", ACM Transactions on Information Systems, vol. 13, No. 4, Oct. 1995,pp. 373-407.
"The Coming Revolution", Communications of the ACM, Jul. 1989, vol. 32, No. 7, pp. 794-901.
Csinger, Andrew, et al., "AI Meets Authoring: User Models for Intelligent Multimedia, Artificial Intelligence Review, special issue on user modelling", 8, pp. 447-468, 1995.
Drapeau, George D. et al., "MAEstro—A Distributed Multimedia Authoring Environment", USENIX, Summer 1991, pp. 315-328.
Drapeau, George D., "Synchronization in the MAEstro Multimedia Authoring Environment", ACM Multimedia 1993, pp. 331-340.
Davenport, Gloriana, et al., "Cinematic Primitives for Multimedia", 1991 IEEE, Jul. 1991, pp. 67-74.
The Electronic Scrapbook: Towards an Intelligent Home-Video Editing System, by Amy Susan Bruckman, Sep. 1991, Video Mosaic: Laying Out Time in a Physical Space.
Eun, Seong Bae, et al., "Specification of Multimedia Composition and a Visual Programming Environment", Proceeding of the first ACM International Conference on Multimedia, pp. 167-173, 1993.
Gephard, C., Der Widersenstigen Zahmung: Computer & Video Radio Fernsehen Electronik, vol. 44, No. 1, Jan. 1, 1995, Berlin, DE.
Gibbs, Simon, "Composite Multimedia and Active Objects", in Proc. OOPSLA 1991, pp. 1-16.
Gibbs, Simon, "Data Modeling of Time-Based Media", SIGMOD '94, 1994 ACM, pp. 91-102.
Gibbs, Simon, "Video Nodes and Video Webs: Uses of Video in Hypermedia", Proc. ACM Conf. on Hypertext, 1992, p. 3.
Girgensohn, Andreas, et al., "A Semi-automatic Approach to Home Video Editing", UIST '00, San Diego, CA, 2000 ACM, CHI Letters vol. 2, 2, pp. 81-89.
Gruenette R., "Authorware and IconAuthor", CD-ROM Professional, vol. 8, No. 10, Oct. 1995, pp. 81-98.
Hardman, H., "New Authoring Tools for Windows", BYTE, vol. 18, No. 9, Aug. 1993, pp. 153-156.
Hardman, Lynda, et al, "Authoring Interactive Multimedia: Problems and Prospects", CWI Quarterly, vol. 7(1) 1994, pp. 47-66.
Hardman, Lynda, et al., "Structured Multimedia Authoring", ACM Multimedia 1993, pp. 283-289.
Herman, I., et al., "MADE: A Multimedia Application Development Environment", CWI Quarterly, vol. 7(1) 1994, pp. 27-46.
Hirata, Kyoji, et al., "Content-Oriented Integration in Hypermedia Systems," Hypertext '86, 7th ACM Conf. On Hypertext, Conf. 7, Mar. 1996, pp. 11-21.
Hirzalla, Nael, et al, "A temporal Model for Interactive Multimedia Scenarios", in IEEE Multimedia, vol. 2, No. 3, Fall 1995, pp. 24-31.
Hudson, Scott E., et al., "The Walk-Through Approach To Authoring Multimedia Documents", Multimedia '94, 1994 ACM, pp. 173-180.
Hung, Yung-Chen, "A Hypervideo System Generator", Software Practice and Experience, vol. 17(11), Nov. 1997, pp. 1263-1281.
Koegel, J.F., et al., "Improving Visual Programming Languages for Multimedia Authoring", Educational Multimedia and Hypermedia Annula, 1993, Proceedings of Ed-Media 93-World on Educational Multimedia and Hypermedia, Jun. 1993, Orlando, FL, pp. 286-293.
Kurlander, David, et al., "A Visual Language for Browsing, Undoing, and Redoing Graphical Interface Commands", in Visual Languages and Visual Programming, 1990, pp. 257-275.
Mackay, W.E., et al., "Video Mosaic: Laying Out Time in a Physical Space", Proceedings of Multimedia '94, San Francisco, CA, ACM, 8 pages.
Mackay, W.E., et al., "Virtual Video Editing in Interactive Multimedia Applications", Communications of the ACM, Jul. 1989, vol. 32, No. 7, pp. 802-810.
Macromind Mediamaker, Macromind Inc., 1990, pp. 129, 165 and 166.
Matthews, James, et al, "VideoScheme: A Programmable Video Editing System for Automation and Media Recognition", ACM Multimedia 1993.
Ohanian, Tom, "The Avid 1 Media Composer", International Broadcast Engineer, Jan. 1991, pp. 22-23.
Open Media Framework, OMF Interchange Specification, Avid Technology, Inc., Version 2.0, Nov. 29, 1995, pp. i-245.
Pazandak, Paul, et al., "A Multimedia Temporal Specification Model and Language", Technical Report 94-33, University of Minnesota, 1994.
Ryan, Mark, et al., "A Development Process for Large Multimedia Titles", 1994 ACM, pp. 126-138.
Sack, Warren et al., "IDIC: Assembling Video Sequences from Story Plans and Content Annotations", In: Proceedings of IEEE International Conf. on Multimedia Computing and Systems in Boston, MA, IEEE Computer Society Press, pp. 30-36, 1994.
Schleicher, Stephen, "How To Create Web Markers in Premiere 6", Digital Video Editing, Digital Media Online, 2001.
"Schneller Zugriff: Video Machine Von Fast", Radio Fernshen Elektronik, vol. 44, No. 11, Nov. 1, 1995, Berlin, DE.
Siochi, A., et al, "The Integrator: A Prototype for Flexible Development of Interactive Digital Multimedia Applications", Interactive Multimedia, vol. 2, No. 3, 1993, pp. 5-26.
Tonomura, Yoshinobu, "Video Handling Based on Structured Information for Hypermedia Systems", Proceedings of the Int'l Conference of Multimedia Information Systems, Jan. 1991, pp. 333-334.
Ueda, Horotada, et al., "Automatic Scene Separation and Tree Structure GUI for Video Editing", ACM Multimedia 96, Boston, MA, 1996 ACM, pp. 405-406.
Ueda, Hirotada et al., "Automatic Structure Visualization for Video Editing"; Interchi '93, 1993 ACM, Apr. 24-29, 1993, pp. 137-141; 545-546.
Ueda, Hirotada, et al., Impact: An Interactive Natural-Motion-Picture Dedicated Multimedia Authoring System, 1991 ACM, pp. 343-350.
Ueda, Hirotada, et al., "Impact: Interactive Motion Picture Authoring system for Creative Talent", 1993 ACM, p. 525.
Wahl, Thomas, et al., "Representing Time in Multimedia Systems", Proc. IEEE Int'l Conf. on Multimedia, 1994, pp. 538-543.
Van der Sluis, Ielka et al., "Enriching Textual Documents with Timecodes from Video Fragments", In: Proceedings RIAO 2000 Content-Based Multimedia Information Access, Paris, Apr. 2000, pp. 431-440.
Wahl, Thomas, et al., "Tiempo: Temporal Modeling and Authoring of Interactive Multimedia", Proc. Int'l Conf. of Multimedia, 1995, pp. 274-277.
Weiss, Ron., et al., "Content-Based Access to Algebraic Video", Proceeding Int'l Conf. on Multimedia Computing and Systems, pp. 140-151, Boston, MA, May 1994.
Bulterman, D.C.A. et al., "GRiNS: A Graphical Interface for creating and playing SMIL Documents", Computer Networks & ISDN Systems, Sep. 30, 1998, North Holland Publishing, Amsterdam, NL, vol. 30, NR. 1-7, pp. 519-529.
Candan, K. Selcuk, et al., "CHIMP: A Framework for Supporting Distributed Multimedia Document Authoring and Presentation", ACM Multimedia 96, Boston, MA, pp. 329-340.
Fahmi, H. et al., "Distributed framework for real-time multimedia object communication", Object-Oriented Real-Time Distributed Computing 2000, ISORC 2000, Proceedings, Third IEEE International Symposium, Newport, CA, USA, Mar. 15-17, 2000, Los Alamitos, CA, USA, IEEE Computer Society, pp. 252-259.
Mines, Robert F. et al., "DAVE: A Plug and Play Model for Distributed Multimedia Application Development", ACM Multimedia 94, San Francisco, CA, pp. 59-66.
Nicol, John R., et al., "How the Internet Helps Build Collaborative Multimedia Applications", Communications of the ACM, Jan. 1999, vol. 42, No. 1, pp. 79-85.

Sauer, S. et al., "Extending UML for modeling of multimedia applications", Visual Languages, 1999, Proceedings 1999 IEEE Symposium, Tokyo, JP, Sep. 13-16, 1999, Los Alamitos, CA, USA, IEEE Computer Society, pp. 80-87.

U.S. Appl. No. 09/539,749, filed Mar. 31, 2000, Balkus et al.

* cited by examiner

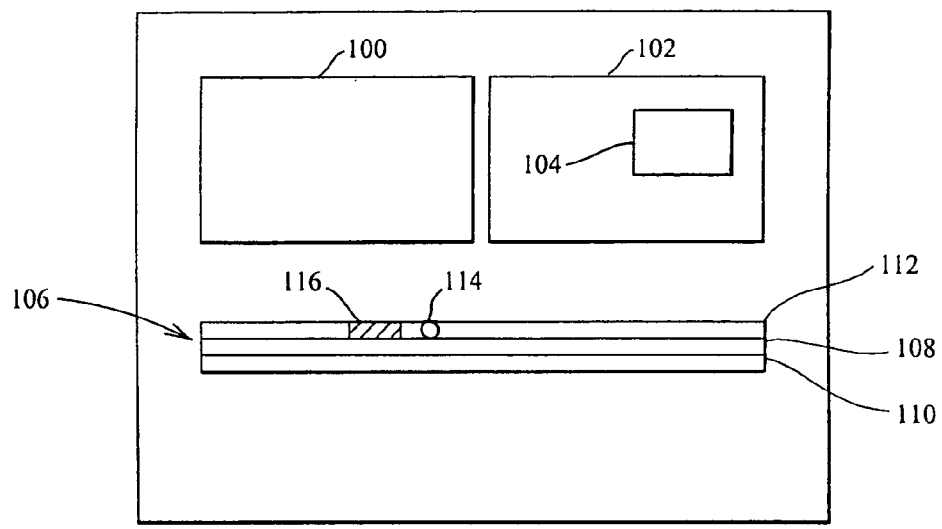
FIG. 1
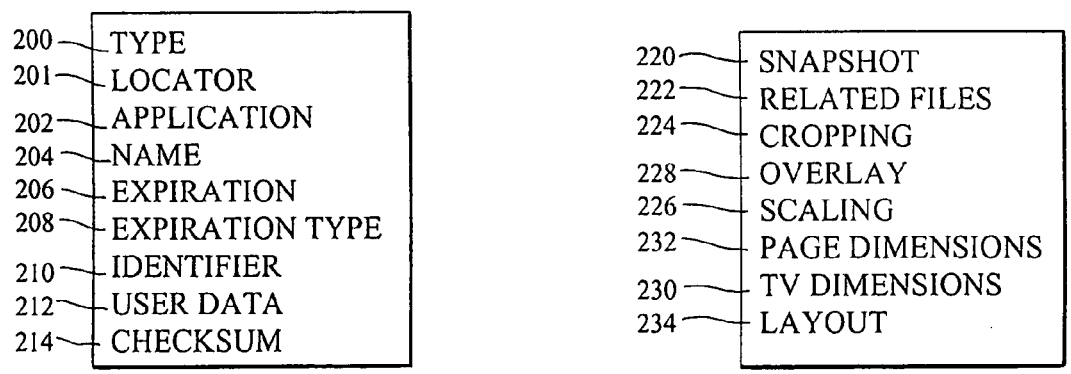
FIG. 2A  FIG. 2B

EDITING TIME-BASED MEDIA WITH ENHANCED CONTENT

CROSS REFERENCE TO RELATED APPLICATIONS

This application claims the benefit under 35 U.S.C.§120, and is a continuing application, of U.S. patent application Ser. No. 09/838,782, filed Apr. 20, 2001, now pending.

BACKGROUND

Programs that combine video and audio with interactive content generally are created using one of two approaches. The first approach involves creating audiovisual content as an element of the interactive program, in which interactive content refers to the audiovisual content. The other approach involves creating an audiovisual program, and then associating interactive content with different points in time in the audiovisual program. In both such approaches, the audiovisual content is created first and then is provided to editors of interactive content who embellish the audiovisual content with interactive content to produce the final interactive program. The interactive content typically is limited to documents in a standard format to be displayed or machine instructions to be executed in conjunction with playback of the audiovisual content.

SUMMARY

Creation of a program with interactive content and time-based media would be improved by having several people working simultaneously on both the interactive content and the time-based media. The range of types of data that can be associated with the time-based media also can include a variety of types of content that enhance the time-based media, including data that is opaque to the editing system. To support editing of such programs, enhanced content may be edited into a program as either a clip or a locator, according to a user's selection. The components that represent enhanced content also may be edited in the same way as components that represent time-based media. Enhanced content may be represented by enhancement files that include data defining enhancements. An enhancement includes an identifier of the enhancement within the enhancement file, and a reference to a file defining enhanced content associated with the enhancement. Such enhancement files may be imported into a bin of an editing system to create components that describe the enhanced content referenced by the enhancements. The enhanced content may be modified using native applications for the enhanced content during editing of the program. The components describing the enhanced content in the editing system can be updated using identifiers of the enhanced content that are stored by the components. Enhanced content also may be automatically synchronized with time-based media.

Accordingly, in one aspect, in an editing system, a timeline is displayed that represents a program and associates enhanced content with a position in time on the timeline and associates time-based media with a position in time on the timeline. The timeline may include at least one track for enhanced content and at least one track for time-based media. A user interface allows a user to place a component representing enhanced content at a position in time on the timeline according to a selection of either a point in time or a duration on the timeline. The enhanced content represented by the component is associated with the point in time or the duration in the program according to the selection. An indication of the component is displayed on the timeline according to the selection.

In another aspect, an editing system displays a timeline representing a program for associating enhanced content with a position in time on the timeline and for associating time-based media with a position in time on the timeline. The timeline may include at least one track for enhanced content and at least one track for time-based media. A user is allowed to place a component representing enhanced content at a position in time on the timeline. The component representing enhanced content includes a field for storing a reference to a file defining the enhanced content. A user is allowed to place a component representing time-based media at a position in time on the timeline. The component representing time-based media includes a field for storing a reference to a file for storing the time-based media. The user also is allowed to perform editing operations on the timeline that affect temporal properties of components on the timeline. The editing operations process components representing enhanced content and components representing time-based media in the same manner.

In another aspect, an editing system for editing a program of time-based media and enhanced content has a bin for storing representations of content accessible by the editing system for placement in the program. Enhanced content is imported into the bin of the editing system using an enhancement file. The enhancement file includes data defining one or more enhancements. An enhancement comprises attributes including an identifier of the enhancement and a reference to a file defining enhanced content associated with the enhancement. The enhancement file is processed to locate each enhancement. For each enhancement, a component is created in the bin of the editing system, wherein the component includes information describing the enhanced content.

In another aspect, a digital information product represents one or more enhancements describing enhanced content for placement in a program of time-based media and enhanced content using an editing system. This digital information product includes a computer readable medium and information stored on the computer readable medium that, when accessed by the computer is interpreted as an enhancement file. The enhancement files includes data defining one or more enhancements. An enhancement includes one or more attributes, including an identifier of the enhancement within the enhancement file, and a reference to a file defining enhanced content associated with the enhancement.

In another aspect, an editing system for editing a program of time-based media and enhanced content has at least one track for enhanced content and at least one track for time-based media. A document is generated in a markup language describing the at least one track for enhanced content by identifying each component representing enhanced content on the at least one track for enhanced content. For each identified component representing enhanced content, an element is created in the markup language document. This element includes a start position of the component on the at least one track for enhanced content, and, if the component is a source clip, then an end position of the component on the at least one track for enhanced content, and a reference to data in the markup language document defining an enhancement that describes the enhanced content represented by the component.

In another aspect, an editing system displays a timeline representing a program for associating enhanced content with a position in time on the timeline and for associating time-based media with a position in time on the timeline. The timeline may include at least one track for enhanced content and at least one track for time-based media. A bin stores representations of enhanced content and time-based media accessible by the editing system for placement in the program. Enhanced content is imported into the bin to create one or more components in the bin. A component in the bin includes information describing the enhanced content including an identifier associated with the enhanced content. A user is allowed to place a component representing enhanced content at a position in time on the timeline, such that the enhanced content represented by the component is associated with the position in time in the program and an indication of the component is displayed on the timeline according to the position in time. The information describing the enhanced content related to a component is updated in the bin using the identifier associated with the enhanced content.

In another aspect, an editing system displays a timeline representing a program. The timeline may include at least one track for enhanced content and at least one track for time-based media. Using the timeline, enhanced content may be associated with a position in time on the timeline and time-based media may be associated with a position in time on the timeline. A user is allowed to relate enhanced content and time-based media to create auto-synchronized content. The user is allowed to place a component representing the auto-synchronized content at a position in time on the timeline. The enhanced content of the auto-synchronized content may be placed on the at least one enhanced content track and the time-based media of the auto-synchronized content may be placed on the at least one time-based media track. The auto-synchronized content represented by the component is associated with the position in time in the program. A user then can perform editing operations on the time-based media of the auto-synchronized content on the timeline such that the editing operations are also performed on the enhanced content of the auto-synchronized content.

BRIEF DESCRIPTION OF THE DRAWINGS

FIG. 1 is an illustration of a graphical user interface enabling editing of time-based media and enhanced content on a timeline.

FIG. 2A is an illustration of example data describing enhanced content.

FIG. 2B is an illustration of example data that may further describe enhanced content.

DETAILED DESCRIPTION

Figure 3A:
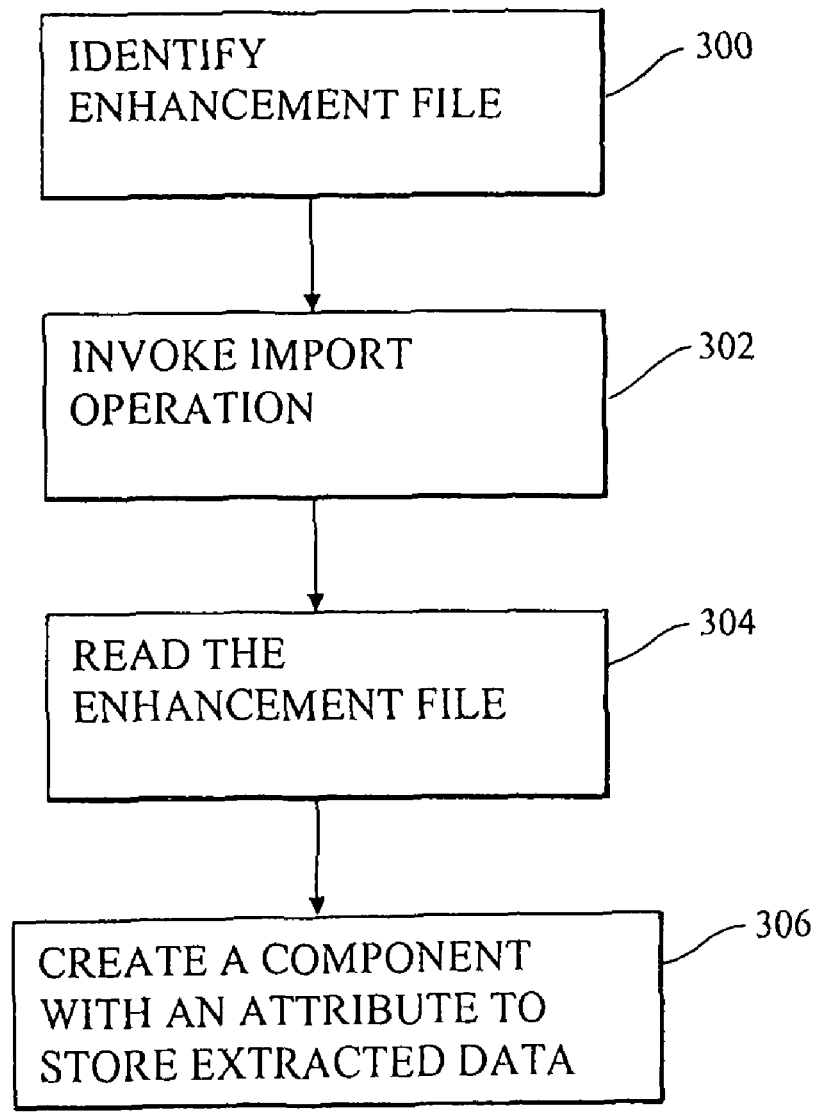
FIG. 3A is a flowchart describing how enhanced content may be imported into a bin.

Time-based media, such as video, audio and animation, may be associated with a variety of types of enhanced content to create a time-based program in which enhanced content is temporally related to the time-based media.

Enhanced content includes any data that may be associated with a position in time in a time-based program. Data may represent, for example, an asset, a service or a function. Examples of such data include, but are not limited to, a database query, closed captioning information, a script of the dialogue of the program, subtitles or dubbing information, information from pre-production and production activities, cost or billing information related to the time-based media, rights management information, and interactive content.

Some enhanced content may be "opaque" to the editing system or to the program itself. Opaque content is content that uses an application other than the editing system for viewing the content, or that uses an application other than the editing system for editing the content, or that is not perceived during playback of the program in the editing system. Example uses of opaque content include supplying information for creating the program or tracking information about the program. Content that is opaque to the editing system may be encoded as part of the final program for distribution. Time-based media or nontemporal media that is not supported by the editing system, such as animation, may be represented as opaque content.

Interactive content includes, but is not limited to, documents defined in a markup language, documents of multiple media types, documents generated by the execution of a script or other computer program that is executed during the program, instructions or command signals sent to equipment, or other events or actions having a position in time during the program that result in content being perceived during playback of the program in the editing system or on a playback device. Interactive content also may include nontemporal media data, such as a still image.

A kind of interactive content is called herein a "trigger." A trigger indicates an operation to be initiated at a point in time during playback of time-based media. Such operations may involve displaying pictures, graphics, images or other information, or other actions such as sending control signals to various devices. Control signals to equipment could be used in some applications, such as ride simulators. Information that may define a "trigger" is specified, for example, in the Advanced Television Enhancement Forum (ATVEF) specification for triggers, for example, as defined in section 1.1.5 of version 1.1 of the ATVEF specification. Other information specified by this and other interactive television formats may be used to define a trigger. A trigger also may indicate duration, synchronization information, or information about the size, position or orientation of display of time-based media associated with the trigger.

FIG. 1 illustrates an example user interface for a system for editing time-based media, such as video and audio, along with enhanced content to create a time-based program in which enhanced content is temporally related to the time-based media.

The user interface in FIG. 1 includes a source window 100 for displaying source media and a record window 102 for displaying an edited program. Video may be displayed in the record window 102 or in a region 104 of the record window 102. The region 104 may be specified by an indication of the size of the video with respect to the associated enhanced content, as described in more detail below, providing a picture-in-picture effect. The region 104 also may display video as a background on which associated enhanced content is overlaid. Other information also could be used to specify a layout of the video and the enhanced content to be viewed in the record window 102.

A timeline interface 106 represents the edited program, and includes one or more enhanced content tracks 112 and one or more time-based media tracks, such as one or more video tracks 108 and one or more audio tracks 110. A track has an associated edit rate or temporal resolution in which positions in time are represented. For example, all tracks may have the same edit rate, which may be determined by the edit rate of a primary video track.

The editing system may use representations of content, herein called "components," to allow a user to place content in the program being edited. A "bin" stores components that represent content that is accessible by the editing system for placement in the program being editing. A bin may be implemented using a folder of a file system of a general purpose computer. If a component representing content is placed at a position in time on a track in the timeline interface, the content represented by the component is associated with the position in time in the program and an indication of the component is displayed on the timeline at the position in time.

In general, to associate time-based media with a position in time on the timeline interface, a user may select from among components representing sources of time-based media from one or more bins. Time-based media represented by a selected component may be viewed in the source window 100. The user may select in and out points in the time-based media source viewed in the source window to designate a component, called a clip, which may be added to a sequence of clips on the time-based media track in the timeline interface 106.

To associate enhanced content with a position in time on the timeline interface, a user may select from among components representing enhanced content from the one or more bins. Information associated with a selected component may be viewed in the source window 100 or in a separate viewing application for the enhanced content, depending on the type of the enhanced content represented by the component and the capabilities of the editing system. The user may select an enhanced content track 112 and a position in time in the track at which the component should be added. The component may be added at a point in time, using a component called a locator 114 (described below), or may be added over a range of time or duration, using a component called a source clip 116 (described below). Time-based media also may be represented using source clips and locators. A user may be prompted by the editing system for a selection of either a point in time or a duration to which the enhanced content is associated.

The timeline interface may be implemented to enable components representing enhanced content to be placed on the same track on the display as the time-based media. Such components may be, for example, either clips or locators. Separate data structures may be used to represent a collection of the components representing the enhanced content and a collection of the components representing the time-based media that are on the same track in the timeline display.

A source clip references a clip in a bin and has a start position and duration in the track. The duration may be represented by a duration or a stop time on the enhancement track. A source clip also may have attributes. The source clip may include a field indicating the type of data that it represents, such as video or audio.

A locator is attached to a clip or other component in the timeline at a point in time on the clip. A locator also may have attributes. The locator may include a field indicating the type of data that it represents, such as interactive content or opaque enhanced content.

Because the types of components used for time-based media and enhanced content are the same, enhanced content has the same behavior as the time-based media. This behavior can be achieved in several ways. For example, components representing time-based media and components representing enhanced content may be instances of subclasses of, and that inherit editing operations from, an object class for which the editing operations are implemented. Components representing time-based media and components representing enhanced content also may be instances of the same object class for which the editing operations are implemented. Components representing time-based media and components representing enhanced content also may be represented using data structures that are acted upon by procedures that implement the editing operations and that provide the same results for these editing operations regardless of the type of the content represented by the component. Thus, editing operations such as cut, slip, slide, trim, lift, splice and overwrite and auto-synchronization of a component representing enhanced content with another source, may be used to edit both time-based media and enhanced content on the timeline and maintain frame accurate synchronization between the enhanced content and the time-based media. Such editing operations are described in more detail in U.S. Pat. No. 5,754,851 and 6,118,444, which are hereby incorporated by reference.

An enhanced content track in the timeline interface may allow a user to place both source clips and locators on the enhanced content track. One or more of such tracks may be provided. Alternatively, separate tracks may be provided for source clips and locators. Separate data structures may be used to represent a track for source clips that represent enhanced content and a track for locators that represent enhanced content.

The editing system also may be configured so that editing of the time-based media is disabled, allowing an editor to focus primarily on the relationship of the enhanced content on the enhanced content track and with the time-based media, if any. Such an editing system can export the edited program directly to another editing system that is enabled to edit both the enhanced content and the time-based media.

An edited program may be represented using any of several data structures, which may be stored in any of a number of formats. For example, a system may use structures corresponding to the Advanced Authoring Format (AAF) specification, Open Media Framework (OMF) specification, or structures described in U.S. Pat. Nos. 6,061,758 and 5,754,851, which are hereby incorporated by reference. In general, the data structure representing the edited program allows a track to be represented as a collection of temporally related components. These components may be represented using collections of sequential components and collections of concurrent components. Kinds of clips may include clips that reference time-based media and enhanced content, of which there are several types described in more detail below. Using AAF, a clip representing enhanced content may be represented as a master clip having the data definition "META." The information associated with the clip may be stored as an attribute sub-list called a "_META " list that includes type-value pairs. An attribute may be stored as a string type. Using AAF, a locator representing enhanced content may be represented as a locator with an attribute list called "_META ". It also may have a data definition of "META."

To allow editing of enhanced content into a program, enhanced content may be imported into bins to create components that may be accessed by the editing system. In a bin, the enhanced content is represented by a clip or other component, with information describing the enhanced content stored as an attribute of the clip or other component. An attribute is, in general, a data field that is used to store a variety of user defined data. To simplify importing enhanced content into a bin, an input format for describing enhanced content is provided. This input format and the process of importing will now be described in more detail.

Information describing enhanced content may be stored as a data file, herein called an "enhancement file," which may be stored in a directory in a file system in either local or shared storage or as a resource accessible through a computer network. An enhancement file includes data defining one or more enhancements that describe enhanced content. The enhancement file may be represented using a markup language such as the eXtensible Markup Language (XML) according to a document type definition (DTD) for enhancement files. An example of such a DTD is provided in Appendix A.

In the example shown in Appendix A, an enhancement is defined by one or more attributes (called a "core attribute list" in Appendix A) and one or more custom attributes (called a "custom attribute list" in Appendix A). The one or more attributes includes the identifier ("id") assigned to the enhancement and a "name" for the enhancement. The identifier of the enhancement is unique within the enhancement file. A type of the enhancement is provided to allow a system to process enhancements of different types in different ways. An example type may be "interactive content" (or "ITV"), or "opaque". An "opaque" type of enhancement is an enhancement that represents opaque content. The type also may be further described by a "sub-type." A "MIME-type" field indicates the MIME type of the data of the enhancement. A locator field indicates a file that defines the enhanced content associated with the enhancement. A native application field indicates an application that can at least open and read the file specified in the locator field. Other tracking information such as the creator, creation date, modifiers and dates of modification also may be included. One or more custom attributes also may be added by a user.

An enhancement file also may specify an ITV type of enhancement, as described above. If an enhancement file and editing system are limited to processing ITV type enhanced content, such as triggers, the enhancement file format may be specified using a document type definition (DTD) specialized for this type of content. An example of such a DTD is provided in Appendix B. In this example format, an enhancement file includes a list of triggers, and a trigger is defined by a locator ("url") that references a file associated with the trigger, and a "name" for the trigger. Other information indicates a date and time at which the trigger "expires." A "script" designates computer program code that may be executed by or for the trigger. An identifier field ("id") stores an identifier for the trigger in the enhancement file. A "checksum" and additional field for "user data" also may be included.

The information describing enhanced content from an enhancement file may be stored by a component in a bin by importing the enhancement file into an editing system. A component in the bin may include information such as shown in FIG. 2A. In particular, an indication of a type of the enhanced content 200 may be provided if numerous types of enhanced content are supported. A locator 201, such as a uniform resource locator (URL) or other file name, may be used to indicate a file that defines the enhanced content. An indication of an application 202, which may be a script for a trigger, such as a Java script program or other computer program code to be executed, may be included. A name 204 also may be stored. This name field may be used as a name or as a readable text description of the enhanced content. Expiration information 206, such as a date and time, and expiration type 208 (indicating whether the expiration information indicates a duration of time the trigger is valid or a time at which the trigger expires) also may be provided for triggers. An identifier field 210 stores the identifier of the enhancement that describes the enhanced content, which may include a reference to the enhancement file. One or more additional fields 212 may be used to store other data such as user defined data, custom attributes, modification and creation dates and user information, or other information described by an enhancement in the enhancement file. A checksum 214 may be included to allow detection of corrupted data.

If the enhanced content is defined by a file for which an image can be created, such as a URL that references an HTML document, information such as shown in FIG. 2B may describe the enhanced content further. This information may include a snapshot 220 of the file. For example, if the file is a document retrieved from a URL, the document may be processed by a browser to generate a snapshot. Any related files 222 (such as linked files), and any indication of cropping 224, scaling 226 or overlay 228 of the associated video on the video track, and the dimensions and position 230 of the video with respect to the snapshot also may be stored. The dimensions 232 of the snapshot also may be obtained and stored. Whether the snapshot is to be overlaid on the video or whether the video is to be displayed within the snapshot as a picture in picture or other layout information 234 also may be specified. The information shown in FIG. 2B also is an example of additional kinds of information that may be used to represent interactive content, such as a document in a markup language such as the hypertext markup language (HTML) or XML.

There are several ways to create enhancement files. For example, an enhancement application may be used to create and modify enhancement files. The enhancement application may be any application that may be used to generate an XML file or file in other suitable format, such as a character delimited file, that may be used to specify fields and associated data for those fields. A spreadsheet application or word processing application, for example, may be used. Using an XML file that conforms to a document type definition allows the format of each enhancement file to be validated.

The enhancement application also may be used to assign a unique identifier (UID) to each enhancement in the enhancement file, or such UIDs may be assigned manually to each enhancement. The UID for an enhancement is stored in the enhancement file. The UID need not be a global unique identifier (GUID), but may be unique only within the enhancement file. The enhancement application also may receive an XML file defining an enhancement file without UIDs and add UIDs to create an enhancement file with the UIDs.

The process of importing enhanced content into a bin using an enhancement file will now be described in connection with FIG. 3A. A user first identifies 300 an enhancement file using any conventional technique to locate the file. An import operation is then invoked 302. The import operation reads 304 the enhancement file to access the data defining one or more enhancements in the enhancement file. After data defining the enhancement is read, a component is created 306 in the bin, with attributes that store information describing the enhanced content. How the data defining the enhancement is used to create a component in the bin may depend on the type of the enhanced content. The attributes that are stored may include the name of the enhancement file storing the enhancement and the identifier of the enhancement in that enhancement file. The attributes that are stored may include a reference to the file defining the enhanced content associated with the enhancement. A reference to a native application for the file also may be stored. A component so created also may have its own unique identifier assigned by the editing application, which is different from the identifier of the corresponding enhancement.

Figure 3B:
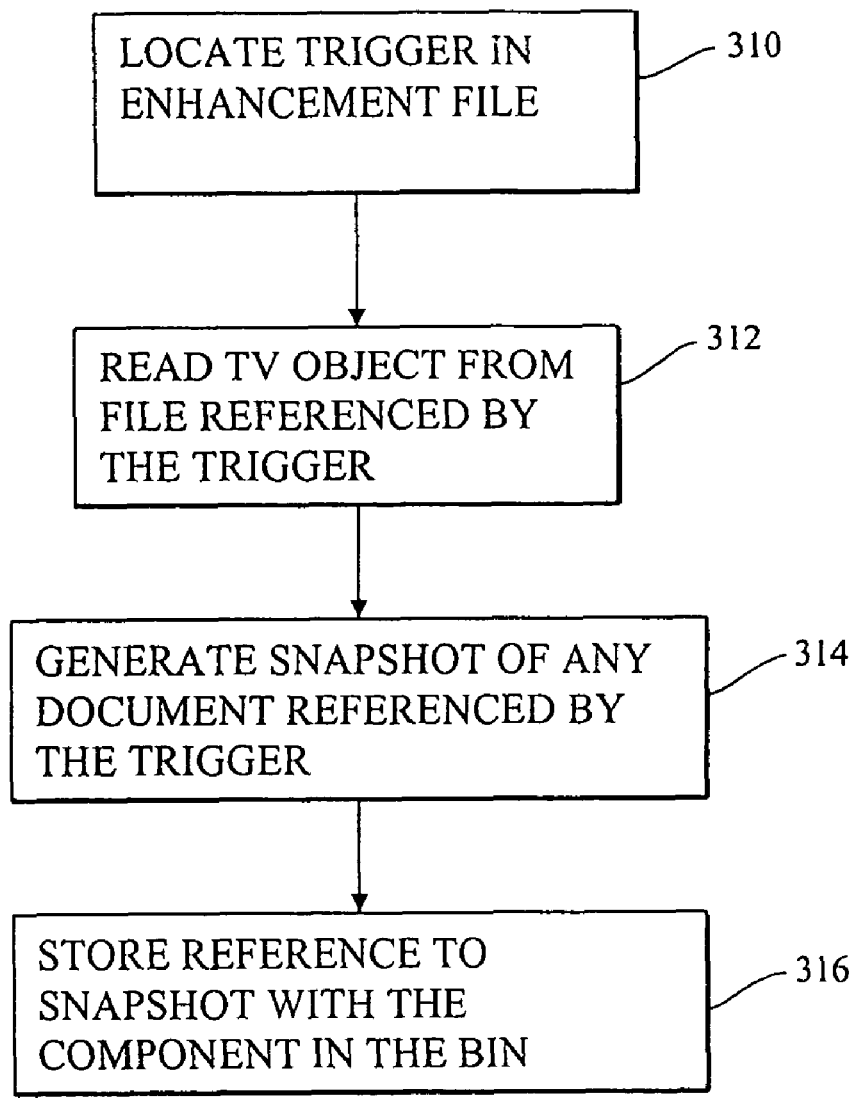
FIG. 3B is a flowchart describing how interactive content may be imported into a bin.

How an enhancement is processed to define a component in the bin may depend on the type of the enhanced content. As an example, if the enhanced content is interactive content, and more particularly a trigger, then (referring now to FIG. 3B) the enhancement is located 310 in the enhancement file. The file defining the trigger that is referenced by the enhancement is accessed 312 to obtain the information described in FIG. 2B. In particular, any "TV:" element or other element in the specified file that specifies the dimension and position of the video and its relationship to the enhanced content and is read to obtain appropriate values. A snapshot of the document defined by the specified file may be generated 314 by applying the document to a conventional browser object and storing the output from the browser object as an image file. The browser object may be instructed to use a background of a unique color, such as green or blue as is commonly used in blue screen and green screen special effects to allow the HTML data to be overlaid on the video using a chroma key operation. A reference to the snapshot may be stored 316 as an attribute of the component in the bin.

It is possible to access and process the entire specified file and files referenced within the specified file for later use. Referenced files might be imported to protect against subsequent unavailability of the specified file or referenced files. Whether the import process includes capturing of HTML data referenced by the URL 200, or the files referred to by the document at the URL 200 may be at the user's selection through an appropriate user interface. It is also possible to import only the HTML data (or other information) for interactive content that is not a trigger. For example, a document in a markup language may be accessed through conventional techniques for locating its file. Files accessed in this manner include any files referenced by a file referenced by a trigger. The file then may be read to extract information that is stored as an attribute of a component in the bin.

Thus, if a trigger is imported into a bin, a component in the bin stores a unique reference for the trigger by storing a reference to the enhancement file and the identifier of the trigger in that enhancement file. The component in the bin also captures the information defining the trigger from the enhancement file and optionally other information from files associated with the trigger, such as the information shown in FIGS. 2A and 2B. For example, if the trigger includes a reference to information to be displayed with the video data or about the display of the video data, this information also may be extracted and stored with the information about the trigger in the bin. Similarly, a document in a markup language, or other interactive content, may be processed to extract information about the document, such as the information described above in connection with FIG. 2B. This information and the reference to the enhancement file are stored as an attribute of a clip or other component. Thus, kinds of components representing triggers in a bin may include HTML clips that reference hypertext markup language (HTML) (or other markup language) data, trigger clips that reference information about triggers, and linked trigger clips that reference both information about triggers and HTML (or other markup language) content. The type of a trigger (whether HTML, Trigger or Linked Trigger) depends on the attributes associated with it.

After enhanced content is imported into a bin, a user may access components representing the enhanced content in the bin using the editing application. Components representing time-based media also may be in a bin. One or more bins may be provided. Separate bins may be provided for different types of content, or a bin may include content of mixed types. Components in a bin may be selected, optionally viewed in a source viewer depending on the type, and added to a timeline. Addition of components to a timeline may be limited to a designated track (e.g., enhanced content may be limited to the enhanced content track 112 in FIG. 1). On an enhanced content track, enhanced content may be added as one of a number of types of components, such as a source clip or a locator.

Enhanced content may be added as a locator on tracks other than the enhanced content track. The information describing the enhanced content is stored as attributes on either the source clip or locator. For triggers, a trigger clip in a bin appears as a locator on the timeline, and the attributes of the trigger clip are transferred to the locator. An HTML clip in a bin appears as a source clip on the timeline, and its attributes are transferred to the source clip. A linked trigger clip and other components representing enhanced content in a bin may appear, upon a user's selection, as either a source clip or a locator on a timeline. The user's selection may be obtained through any appropriate user interface.

Components representing enhanced content also may be automatically synchronized to components representing time-based media in the bin by associating the components with each other. This association creates a new component that may be added to a program. With the new component, the component representing enhanced content remains associated with the component representing time-based media through operations performed on the time-based media during editing. The editing operations performed in the time-based media also are performed on the associated component representing enhanced content.

Because the types of components used for time-based media and enhanced content are the same, enhanced content has the same behavior as the time-based media in response to editing operations. Thus, editing operations such as cut, slip, slide, trim, lift, splice and overwrite and auto-synchronization of the enhanced content with another source, may be used to edit both time-based media and enhanced content together and maintain frame accurate synchronization between the enhanced content and the time-based media.

If a program has been edited using the timeline interface described above, it may be played back, for example in the record window of FIG. 1 or to an external monitor. If the some enhanced content includes information, such as shown in FIG. 2B, that indicates how the video should be displayed with the enhanced content, then this information may be used to control the display of the video at the position in time for that enhanced content.

Figure 4:
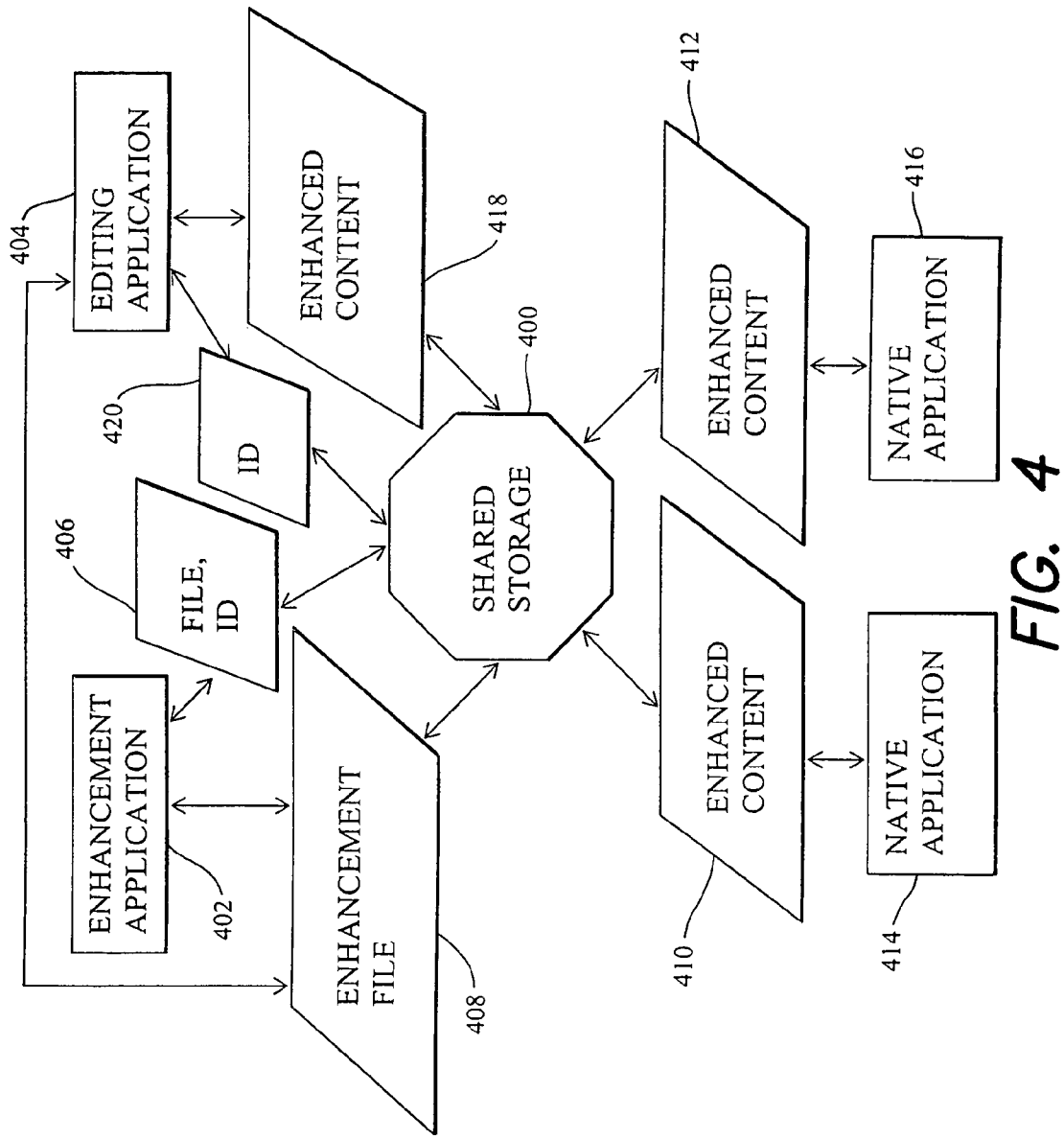
FIG. 4 is a diagram illustrating a multi-user system for editing time-based media and enhanced content.

Referring now to FIG. 4, an example system for simultaneous authoring of time-based and enhanced content for a program is described. In this example, enhancement files 408 may be created and modified by the enhancement application 402, described above, and stored on shared storage 400. Such shared storage may be a computer network, a shared file system, a distributed file system, a set of file servers or any other mechanism to share information between the systems. The enhancement application 402 uses a reference to the enhancement file, such as the file name, and an identifier 406 of an enhancement to access the shared storage for reading and/or writing of data defining enhancements in enhancement files 408. Enhancements may refer to content files 410 and 412 that are stored on the shared storage 400 or some other location. These content files may be created and modified using a variety of native applications 414 and 416. The native applications may be, for example, content authoring tools, or a database application, a script writing program, or any other application that creates a file defining enhanced content. An editing application 404, such as described above in connection with FIGS. 1-3, may be used to create and modify the program by combining time-based media and enhanced content in the manner described above. Enhanced content 418 may be imported into a bin for the editing application 404 using enhancement files 408 and content files 410, 412, to create components that may be selected for insertion into the program. An identifier 420 for the enhanced content 418, such as a reference to the enhancement file 408 and an identifier for the enhancement describing the enhanced content, or other identifier, such as a reference to a file defining the enhanced content, may be used by the editing application to access the enhanced content 418.

The editing application also may be programmed to launch a native application 414, 416 associated with an enhanced content that is stored in a bin or that is placed on an enhanced content track. For example, the editing application may be programmed to allow a user to use any conventional operation to select the enhanced content that is in the bin or on the enhanced content track. The editing application then can cause the associated native application to launch, access and open for editing the enhanced content associated with the component that is in the bin or on the enhanced content track.

With such a system, multiple editors may be working on different parts of a program at one time. Thus, enhanced content files 410 and 412 or enhancement files, or enhancements within them, may change after they are imported into a bin of the editing application 404. However, the unique references for the enhanced content in the bin, e.g., the enhancement file name and identifier for an enhancement or a reference to a file defining the enhanced content, may be used to obtain updated enhanced content from its source. This updating process is called a refresh operation. The refresh operation is similar to an import operation except for the method of identification of the enhancement file. In a refresh operation, information describing the enhanced content that has been selected for refresh is extracted from currently available sources that correspond to the identifiers associated with the enhanced content, e.g., the identifier for an enhancement or the reference to a file defining the enhanced content.

Figure 5:
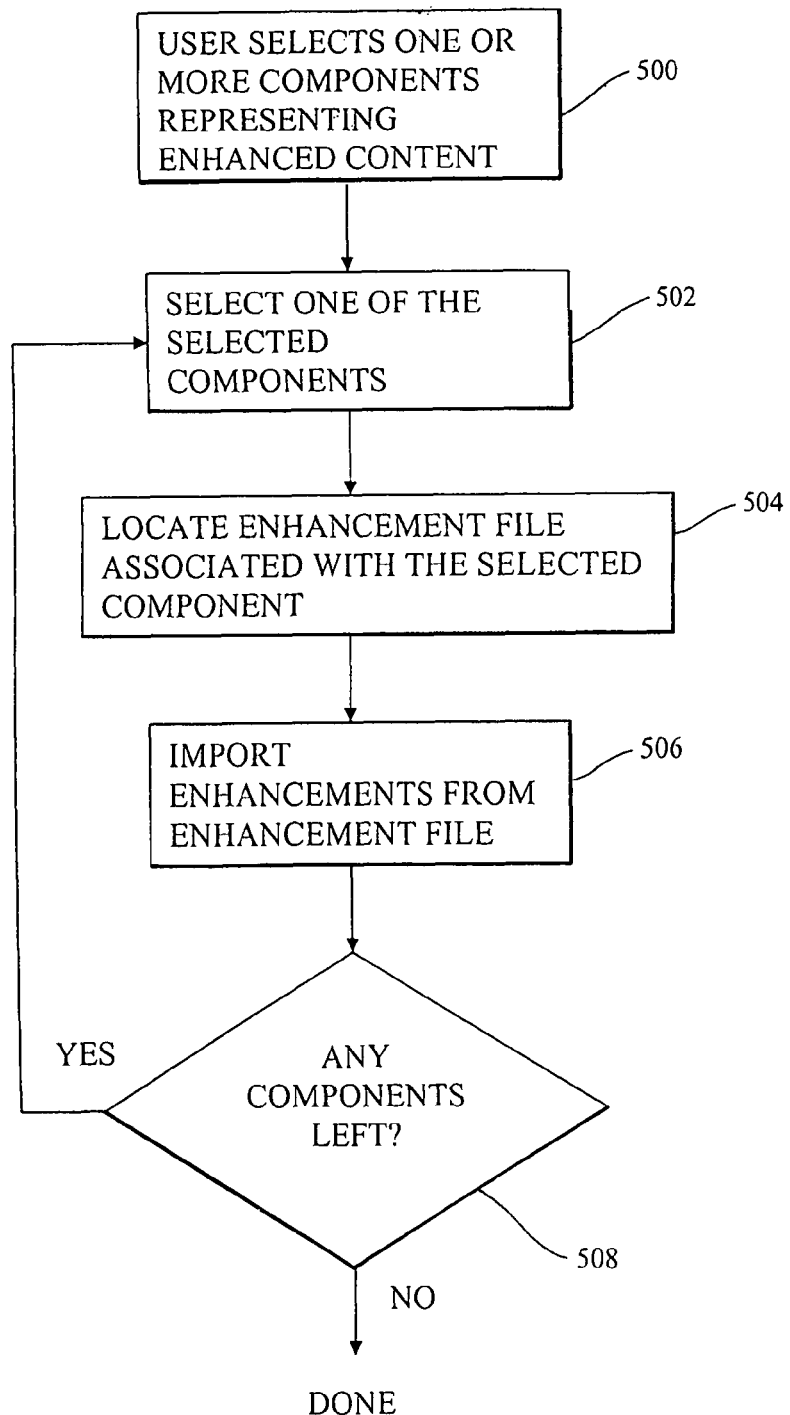
FIG. 5 is a flowchart describing how enhanced content may be refreshed.

Referring to FIG. 5, to perform a refresh operation on enhanced content, the user may select 500 one or more components in the bin to be refreshed, for example by selecting a particular component, components that reference the same identifier, or components on a track or components in a bin. One of the selected components is selected 502. The name of the enhancement file and the identifier of the enhancement for the selected components are used to locate 504 the enhancement file from the shared storage (400 in FIG. 4). The enhancement is then imported 506 in the same manner as described above in connection with FIGS. 3A and 3B. If no components remain to be refreshed, as determined in 508, the refresh operation is complete, otherwise, the next component of the selected components is then selected 502 and the steps 502-508 are repeated. Similar operations also can be performed on other enhanced content using an identifier, e.g., a URL or other reference to a file that defines the enhanced content.

Upon completion of the editing of a program that includes both enhanced content and time-based media, it is possible that there are many possible distribution formats for the program. Therefore, the program may be transformed from its representation in the editing system, using the program data structures and enhanced content, into one or more encoded distribution formats, such as ATVEF, WebTV, Liberate, broadband interactive TV, wireless, digital versatile disk (DVD), or Internet or computer streaming format or other format for the particular distribution channel or interactive application, using encoding techniques appropriate to the application.

To simplify the encoding process the editing system may output a file describing the program and the enhanced content. The output may be, for example, a file conforming to the AAF specification. Such a file also may be used to generate an XML file that describes the content of the enhanced content track(s) of the program. Such a file may conform to a document type definition as shown in Appendix C. This DTD includes the same information as in the DTD in Appendix A, but also defines an "interactive timeline" element that include an AAF header element, an edit rate element, a start time element and one or more meta track elements. The AAF header defines information relevant to the associated AAF file that can be created by the editing system. The edit rate element indicates the temporal resolution of the editing operations for the program. The start time represents the time code of the first frame of the program. A metatrack element is represented by a track number, a track name, a reference to a track that includes clips and an optional reference to a track that includes locators, if a separate tracks are used for representing clips and locators of enhanced content.

An enhanced content track for clips is represented by an integer "slotid" that is the identifier in AAF of the track, and one or more clips. A clip is represented by the element in the markup language document defining the associated enhancement and data representing the start and end times of the corresponding enhanced content on the track. The "startframes" and "endframes" refers to the start time and end time of the clip on the track in frames. The data representing the start and end times of the clip on the track also may be represented in any of a number of timecode formats, including, but not limited to, 24 frame per second, 25 frames per second with pulldown, 25 frames per second, 30 frames per second in drop frame format, and 30 frames per second in non-drop frame format. 23.976 frame per second format also may be provided. If the edit rate is 24 frames per second, the start and end times can be readily maintained in all of the different formats.

An enhanced content track for locators, if a separate track is maintained, is represented by an integer "slotid" that is the identifier in AAF of the track, and one or more locators. A locator is represented by the element in the markup language document defining the associated enhancement, and data representing the position of the enhanced content on the track. The "positionframes" refers to the position of the locator on the track in frames. The data representing the position of the locator on the track may be represented in any of a number of timecode formats, including, but not limited to, 24 frame per second, 25 frames per second with pulldown, 25 frames per second, 30 frames per second in drop frame format, and 30 frames per second in non-drop frame format. 23.976 frame per second format also may be provided. If the edit rate is 24 frames per second, the position can be readily maintained in all of the different formats.

By using enhanced content in the manner described above, various information can be associated with time-based media during editing.

As one example, information about the source, cost or usage rights associated with time-based media used in the program may be stored for tracking, billing or compliance services. The components representing enhanced content may be automatically synchronized with the time-based media in the bin. The actual usage of the time-based media in the program, in connection with this stored information, can be used for billing, tracking and compliance regarding media rights.

As another example, a scriptwriting program can be used to create a list of characters associated with a film. A character name may be associated with the lines for the character in the dialog. The information about a character may be referenced by a component that also references back to the screenplay. A clip of time-based media may be associated with a component that references a character in that clip. Through this association between the screenplay and the time-based media, it can be determined when each character spoke, how long each character spoke, and what each character said. Similarly, the script information can be used to assist speech recognition of the audio track, identify time-based media clips in a bin that are associated with the script, provide subtitles or closed captioning or assist in dubbing.

As another example, information about primary scene locations in a program may be placed in components that are automatically synchronized with the time-based media for the scene through an association in the bin. This information in the components could be used for DVD authoring, for example, by providing information to create an index of the program.

As another example, instructions to a ride simulator, such as up, down, left, right, skew left and skew right or other commands to various mechanical devices used in such entertainment venues, may be placed in components. Such components may be placed on the enhanced content track to represent when, in association with the time-based media, the ride simulator or other device takes the corresponding actions. The instructions to the device may be in a format that can be processed by the device, such as a GPI trigger for a ride simulator. For some ride simulator devices, the motion of the device is represented by a start and stop position of the device. The speed at which the motion is made is a function of time, which may be represented on the enhanced content track by representing the motion as a source clip. The duration of the clip on the enhanced content track may be used to represent the time in which the device moves from the start to the stop position, and thus determines the speed of motion. The instructions to the device also may be converted from a format specified in the component into another format in which the information can be transmitted to and processed by the device. For example, instructions may be encoded in a communication format such as infrared signals, audio signals out of the audible range, other wireless interconnect or network communication protocol.

As another example, the time-based media may be associated with environmental and lighting controls represented by enhanced content on the enhanced content track. A component may represent instructions to open or close curtains and dim or brighten lights in a theatre, for example.

As another example, the components representing enhanced content may be used to represent images, drawings or other information for storyboarding. Various components may be created to reference files that represent scenes of the program. Different types of files could be used to represent different scenes. These components could be placed on the enhanced content track as source clips, to signify the timing of the scenes in the storyboard. This editing of a storyboard using the enhanced content track could be performed before the time-based media is available for editing. Whether playback of the storyboard in the editing system could be performed depends on the availability of the native applications or other application to convert the referenced files into image and/or sound data that can be processed by the editing system.

Such a system may be implemented using a computer program on a general purpose computer. Such a computer system typically includes a processor, an input device, a display device, and a memory. The memory stores software for performing the various functions described above. The computer display device displays a software generated user interface such as shown in FIG. 1 to accommodate the functionality.

The computer system may be a general purpose computer which is available from a number of computer system manufacturers as is well known by those of ordinary skill in the art. The computer system executes an operating system, such as Windows by Microsoft Corporation, MAC OS X by Apple Computer, Solaris by Sun Microsystems, Inc., IRIX by Silicon Graphics, Inc., or a version of UNIX. The invention is not limited to any particular computer system or operating system or programming language or programming techniques. The memory stores data and instructions. The memory may include both a volatile memory such as RAM and non-volatile memory such as a ROM, a magnetic disk, an optical disk, a CD-ROM or the like. The input device allows the user to interact with the computer system. The input device may include, for example, one or more of a keyboard, a mouse, or a trackball. The display device displays a user interface. The display device may include, for example, a cathode ray tube (CRT), a flat panel display, or some other display device.

Having now described example implementations, it should be apparent to those skilled in the art that the foregoing is merely illustrative and not limiting, having been presented by way of example only. Numerous modifications and other implementations are within the scope of one of ordinary skill in the art and are contemplated as falling within the scope of the invention.

APPENDIX A

```
<?xml version="1.0" encoding+32 "UTF-8"?>
<!ENTITY % STRING            "CDATA #REQUIRED"?>
<!ENTITY % TYPE              "type %STRING; ">
<!ENTITY % VALUE             "value %STRING; ">
<!ELEMENT enhancements       (enhancement) + >
<!ATTLIST enhancements       version %STRING;>
<!ELEMENT enhancement
       (core_attribute_list,custom_attribute_list*)>
<!ELEMENT core_attribute_list (id, name, type, sub-type,
MIME-type, locator, native, created_by, created_on,
modified_by, modified_on, modified_from)>
<!ELEMENT id EMPTY>
<!ATTLIST id type CDATA #FIXED "ID" %VALUE;>
<!ELEMENT name EMPTY>
<!ATTLIST name type CDATA #FIXED "META Name"    %VALUE;>
<!ELEMENT type EMPTY>
<!ATTLIST type type CDATA #FIXED "META Type"    %VALUE;>
<!ELEMENT sub-type EMPTY>
<!ATTLIST sub-type type CDATA #FIXED "META Sub-type"
       %VALUE;>
<!ELEMENT MIME-type EMPTY>
<!ATTLIST MIME-type type CDATA #FIXED "MIME Type"
%VALUE;>
<!ELEMENT locator EMPTY>
<!ATTLIST locator type CDATA #FIXED "File Location"
%VALUE;>
<!ELEMENT native EMPTY>
<!ATTLIST native type CDATA #FIXED "Native Application"
%VALUE;>
<!ELEMENT created_by EMPTY>
<!ATTLIST created_by type CDATA #FIXED "Created by"
%VALUE;>
<!ELEMENT created_on EMPTY>
<!ATTLIST created_on       type CDATA #FIXED "Created on"
%VALUE;>
<!ELEMENT modified_by EMPTY>
<!ATTLIST modified_by type CDATA #FIXED _Modified by"
%VALUE;>
<!ELEMENT modified_on EMPTY>
<!ATTLIST modified_on type CDATA #FIXED "Modified on"
%VALUE;>
<!ELEMENT modified_from EMPTY>
<!ATTLIST modified_from type CDATA #FIXED    "Modified from"
%VALUE;>
<!ELEMENT custom_attribute_list(attribute) *>
<!ELEMENT attribute EMPTY>
<!ATTLIST attribute %TYPE; %VALUE;>
```

APPENDIX B

```
<?xml version="1.0" encoding="UTF-8" ?>
<!--
    ! ! The trigger-list includes none, one, or many
triggers
        ! ! A trigger is represented by
        ! ! <URL> [attr1 : val1][attr2 : val2] ...[attrn :
valn] [checksum]
-->
<!ELEMENT trigger-list (trigger)*>
<!ELEMENT trigger ((url) | (name)? | (expires)? | (script)?
| (checksum)? | (user-data)?)>
<!ELEMENT url (#PCDATA)>
<!ELEMENT name (#PCDATA)>
<!ELEMENT expires ((date)? | (time)?)>
<!ELEMENT date (year, month, day)>
<!ELEMENT year (#PCDATA)>
<!ELEMENT month (#PCDATA)>
<!ELEMENT day (#PCDATA)>
<!ELEMENT time (hours, minutes, (seconds)?)>
<!ELEMENT hours (#PCDATA)>
<!ELEMENT minutes (#PCDATA)>
<!ELEMENT seconds (#PCDATA)>
<!ELEMENT script (#PCDATA)>
<!ELEMENT id (#PCDATA)>
<!ELEMENT checksum (#PCDATA)>
```

APPENDIX C

```
<!ELEMENT enhancements (enhancement)+>
<!ATTLIST enhancements version CDATA #REQUIRED>
<!ELEMENT enhancement (core_attribute_list,
custom_attribute_list*)>
<!ELEMENT core_attribute_list (id, name, type, sub-type,
MIME-type, locator, native, created_by, created_on,
modified_by, modified_on, modified_from)>
<!ELEMENT id EMPTY>
<!ATTLIST id type CDATA #FIXED "ID" value CDATA #REQUIRED>
<!ELEMENT name EMPTY>
<!ATTLIST name type CDATA #FIXED "META Name" value CDATA
#REQUIRED>
<!ELEMENT type EMPTY>
<!ATTLIST type type CDATA #FIXED "META Type" value CDATA
#REQUIRED>
<!ELEMENT sub-type EMPTY>
<!ATTLIST sub-type type CDATA #FIXED "META Sub-type" value
CDATA #REQUIRED>
<!ELEMENT MIME-type EMPTY>
<!ATTLIST MIME-type type CDATA #FIXED "MIME Type" value
CDATA #REQUIRED>
<!ELEMENT locator EMPTY>
<!ATTLIST locator type CDATA #FIXED "File Location" value
CDATA #REQUIRED>
<!ELEMENT native EMPTY>
<!ATTLIST native type CDATA #FIXED "Native Application"
value CDATA #REQUIRED>
<!ELEMENT created_by EMPTY>
<!ATTLIST created_by type CDATA #FIXED "Created by" value
CDATA #REQUIRED>
<!ELEMENT created_on EMPTY>
<!ATTLIST created_on type CDATA #FIXED "Created on" value
CDATA #REQUIRED>
<!ELEMENT modified_by EMPTY>
<!ATTLIST modified_by type CDATA +190FIXED "Modified by" value
CDATA #REQUIRED>
<!ELEMENT modified_on EMPTY>
<!ATTLIST modified_on type CDATA #FIXED "Modified on" value
CDATA #REQUIRED>
<!ELEMENT modified_from EMPTY>
<!ATTLIST modified_from type CDATA #FIXED "Modified from"
value CDATA #REQUIRED>
<!ELEMENT custom_attribute_list (attribute)*>
<!ELEMENT attribute EMPTY>
<!ATTLIST attribute type CDATA #REQUIRED value CDATA
#REQUIRED>
<!-- This is the root tag of the XML file. It defines the
Interactive Timeline. -->
<!ELEMENT InteractiveTimeline (AAFHeader, editrate,
starttime, META_Track*)>
<!ATTLIST InteractiveTimeline version CDATA #REQUIRED>
<!-- Header provides file-wide information and indexes. An
AAF file shall have one and only one Header object -->
<!ELEMENT AAFHeader (lastmodified, version,
generationauid+)>
<!-- Time and date the file was last modified-->
<!ELEMENT lastmodified (#PCDATA)>
<!-- Version number of the document that the file conforms
to; shall be 1.0 or higher-->
<!ELEMENT version (#PCDATA)>
<!-- AUID generated at the time the application created or
opened file for modification -->
<!ELEMENT generationauid (#PCDATA)>
<!-- This is the END of the AAF Header -->
<!-- This is the Composition EditRate -->
<!ELEMENT editrate (#PCDATA)>
<!-- This is the Composition StartTime in TimeCode -->
<!ELEMENT starttime (#PCDATA)>
<!-- The InteractiveTimeline consists of one or more
META_Tracks -->
<!ELEMENT META_Track (physicaltracknumber,
physicaltrackname, timelinemobslot, eventmobslot?)>
<!-- Specifies the physical channel -->
<!ELEMENT physicaltracknumber (#PCDATA)>
<!-- Specifies an optional text name for the slot -->
<!ELEMENT physicaltrackname (#PCDATA)>
<!-- Specifies the timeline mob slot which can contain 0 or
more enhancementclips-->
<!ELEMENT timelinemobslot (slotid, enhancementclip*)>
<!-- Specifies an integer that is used to reference the mob
slot-->
<!ELEMENT slotid (#PCDATA)>
<!-- Specifies an enhancementclip which contains an
enhancement and its start and end times on the track. The
start and end times will always be specified in frames.
Depending on the project start and end times in additional
timecodes will be available -->
<! ELEMENT enhancementclip (enhancement, starttime_frames,
endtime_frames, starttime_24? , endtime_24?
endtime_25P?
endtime_30D?
    <!ELEMENT starttime_frames (#PCDATA)>
    <!ELEMENT starttime_24 (#PCDATA)>
    <!ELEMENT starttime_25P (#PCDATA)>
    <!ELEMENT starttime_25 (#PCDATA)>
    <!ELEMENT starttime_30D (#PCDATA)>
    <!ELEMENT starttime_30ND (#PCDATA)>
    <!ELEMENT endtime_frames (#PCDATA)>
    <!ELEMENT endtime_24 (#PCDATA)>
    <!ELEMENT endtime_25P (#PCDATA)>
    <!ELEMENT endtime_25 (#PCDATA)>
    <!ELEMENT endtime_30D (#PCDATA)>
    <!ELEMENT endtime_30ND (#PCDATA)>
<!-- Specifies the event mob slot which can contain 1 or
more enhancementlocators-->
<!ELEMENT eventmobslot (slotid, enhancementlocator+)>
<!-- Specifies an enhancementlocator which contains an
enhancement and its position on the track. The position
will always be specified in frames. Depending on the
project position in additional timecodes will be available
-->
<!ELEMENT enhancementlocator (enhancement, position_frames,
position_24?
position_30ND? )>
    <!ELEMENT position_frames (#PCDATA)>
    <!ELEMENT position_24 (#PCDATA)>
    <!ELEMENT position_25P (#PCDATA)>
    <!ELEMENT position_25 (#PCDATA)>
    <!ELEMENT position_30D (#PCDATA)>
    <!ELEMENT position_30ND (#PCDATA)>
```

What is claimed is:

1. A method for generating a document in a markup language describing a program of time-based media and enhanced content, the program having at least one track for enhanced content which includes a plurality of components, and at least one track for time-based media, the method comprising:

(1) identifying each component that represents enhanced content and that is on the enhanced content track;
(2) for each identified component representing enhanced content, creating:
(a) a first element in the markup language document specifying the enhanced content represented by the component; and
(b) a second element in the markup language document specifying a temporal position at the enhanced content represented by the component is placed in the program on the enhanced content track, wherein the second element comprises:
(1) a start position of the component on the enhanced content track, thereby indicating the temporal position in the program where the enhanced content is to be placed;
(2) a reference to the first element in the markup language document, thereby indicating the enhanced content to be placed in the program at the start position; and
(3) if the component is a source clip, then an end position of the component on the enhanced content track.

2. The method of claim 1, wherein the start position is specified in a plurality of time code formats.

3. The method of claim 2, wherein the reference to the first element in the markup language document comprises a child element of the second element containing the data defining an enhancement that describes the enhanced content represented by the component, and wherein, for each time format, the second element includes an additional child element containing data representing the location in the time format.

4. The method of claim 2, wherein the end position is specified in a plurality of time code formats.

5. The method of claim 4, wherein the plurality of time code formats includes 24 frames per second, 25 frames per second and 30 frames per second.

6. The method of claim 1, wherein the data defining the enhancement comprises: one or more attributes, including:
an identifier of the enhancement within the enhancement file; and
a reference to a file defining the enhanced content associated with the enhancement.

7. The method of claim 6, wherein the one or more attributes further includes:
an identifier of a native application for processing the file defining the enhanced content.

8. The method of claim 7, wherein the one or more attributes further includes:
a type indicating a type of the enhancement.

9. The method of claim 8, wherein the one or more attributes further includes:
one or more custom attributes for the enhancement.

10. The method of claim 7, wherein the one or more attributes further includes:
one or more custom attributes for the enhancement.

11. The method of claim 6, wherein the one or more attributes further includes:
a type indicating a type of the enhancement.

12. The method of claim 11, wherein the one or more attributes further includes:
one or more custom attributes for the enhancement.

13. The method of claim 6, wherein the one or more attributes further includes:
one or more custom attributes for the enhancement.

14. The method of claim 1, further comprising:
identifying each of the at least one tracks for enhanced content; for each identified track for enhanced content, creating an interactive timeline element in the markup language document comprising:
a reference to each element in the markup language document that describes a component representing enhanced content on the identified track for enhanced content.

15. The method of claim 1, wherein the reference to the first element in the markup language document comprises a child element of the second element containing the data defining an enhancement that describes the enhanced content represented by the component.

16. The method of claim 15, wherein the data defining the enhancement comprises a third markup language element, wherein the third markup language element is a child element of the first element and contains a first child element containing an identifier of the enhancement within the enhancement file, a second child element containing a reference to a file defining the enhanced content associated with the enhancement.

17. The method of claim 16, wherein the data defining the enhancement further comprises a third child element of the third markup language element containing an identifier of a native application for processing the file defining the enhanced content.

18. The method of claim 1, wherein the first element is not contained within the second element.

19. A computer program product, comprising:
a computer readable medium;
computer program instructions stored on the computer readable medium that, when executed by a computer, define an editing system for editing a program of time-based media and enhanced content wherein the program has at least one track for enhanced content which includes a plurality of components, and at least one track for time-based media, and instruct the computer to perform a method for generating a document in a markup language describing the at least one track for enhanced content, the method comprising:
(1) identifying each component that represents enhanced content and that is on the enhanced content track;
(2) for each identified component representing enhanced content, creating:
(a) a first element in the markup language document specifying the enhanced content represented by the component; and
(b) a second element in the markup language document specifying a temporal position of the enhanced content represented by the component is placed in the program on the enhanced content track, wherein the second element comprises:
(1) a start position of the component on the enhanced content track, thereby indicating the temporal position in the program where the enhanced content is to be placed;
(2) a reference to the first element in the markup language document, thereby indicating the enhanced content to be placed in the program at the start position; and
(3) if the component is a source clip, then an end position of the component on the enhanced content track.

20. The computer program product of claim 19, wherein the reference to the first element in the markup language document comprises a child element of the second element containing the data defining an enhancement that describes the enhanced content represented by the component.

21. The computer program product of claim 20, wherein the start position is specified in a plurality of time code formats, and wherein, for each time format, the second element includes an additional child element containing data representing the location in the time format.

22. The computer program product of claim 20, wherein the data defining the enhancement comprises a third markup language element, wherein the third markup language element is a child element of the first element and contains a first child element containing an identifier of the enhancement within the enhancement file, a second child element containing a reference to a file defining the enhanced content associated with the enhancement.

23. The computer program product of claim 22, wherein the data defining the enhancement further comprises a third child element of the third markup language element containing an identifier of a native application for processing the file defining the enhanced content.

24. The computer program product of claim 19, wherein the first element is not contained within the second element.

25. An computer-implemented editing system for editing a time-based program of time-based media and enhanced content, comprising:
 a processor that processes a computer program so as to provide a timeline interface having at least one track for enhanced content and at least one track for time-based media; and
 wherein the processor is further configured to generate a document in a markup language describing the at least one track for enhanced content, by identifying each component that represents enhanced content and that is on the enhanced content track; and by creating, for each identified component representing enhanced content:
  (a) a first element in the markup language document specifying the enhanced content represented by the component; and
  (b) a second element in the markup language document specifying a temporal position of the enhanced content represented by the component is laced in the program on the enhanced content track, wherein the second element comprises:
   (1) a start position of the component on the enhanced content track, thereby indicating the temporal position in the program where the enhanced content is to be placed;
   (2) a reference to the first element in the markup language document, thereby indicating the enhanced content to be placed in the program at the start position; and
   (3) if the component is a source clip, then an end position of the component on the enhanced content track.

26. The computer-implemented editing system of claim 25, wherein the reference to the first element in the markup language document comprises a child element of the second element containing the data defining an enhancement that describes the enhanced content represented by the component.

27. The computer-implemented editing system of claim 26, wherein the start position is specified in a plurality of time code formats, and wherein, for each time format, the second element includes an additional child element containing data representing the location in the time format.

28. The computer-implemented editing system of claim 26, wherein the data defining the enhancement comprises a third markup language element, wherein the third markup language element is a child element of the first element and contains a first child element containing an identifier of the enhancement within the enhancement file, a second child element containing a reference to a file defining the enhanced content associated with the enhancement.

29. The computer-implemented editing system of claim 28, wherein the data defining the enhancement further comprises a third child element of the third markup language element containing an identifier of a native application for processing the file defining the enhanced content.

30. The computer-implemented editing system of claim 25, wherein the first element is not contained within the second element.

* * * * *

UNITED STATES PATENT AND TRADEMARK OFFICE
CERTIFICATE OF CORRECTION

| | | |
|---|---|---|
| PATENT NO. | : 7,930,624 B2 | Page 1 of 1 |
| APPLICATION NO. | : 10/115693 | |
| DATED | : April 19, 2011 | |
| INVENTOR(S) | : Michael Phillips et al. | |

It is certified that error appears in the above-identified patent and that said Letters Patent is hereby corrected as shown below:

On the Title Page
Related U.S. Application Data, Item (63), replace "Continuation" with --Continuation-in-part--.

Column 1, Cross Reference To Related Applications, line 8, replace "continuing application" with --continuation-in-part--.

Signed and Sealed this
Twenty-first Day of June, 2011

David J. Kappos
*Director of the United States Patent and Trademark Office*